United States Patent
Green (10) Patent No.: US 7,268,925 B1
(45) Date of Patent: Sep. 11, 2007

(54) IMAGE SENSOR OPTIMIZATION

(75) Inventor: Lawrence R. Green, Tacoma, WA (US)

(73) Assignee: Pritest, Inc., Redmond, WA (US)

( * ) Notice: Subject to any disclaimer, the term of this patent is extended or adjusted under 35 U.S.C. 154(b) by 1007 days.

(21) Appl. No.: 10/373,408

(22) Filed: Feb. 24, 2003

(51) Int. Cl.
*H04N 1/04* (2006.01)

(52) U.S. Cl. .................. 358/486; 358/406; 358/509; 358/475; 382/167; 348/241; 348/243; 435/7.1

(58) Field of Classification Search ............. 358/509, 358/483, 474–475, 406, 486; 348/294, 241, 348/243; 250/280.1; 435/7.1, 287.2; 382/167, 382/128
See application file for complete search history.

(56) References Cited

U.S. PATENT DOCUMENTS

| | | | |
|---|---|---|---|
| 6,069,973 A * | 5/2000 | Lin et al. ................. | 382/167 |
| 6,459,509 B1 * | 10/2002 | Maciey et al. ............ | 358/474 |
| 6,462,768 B1 | 10/2002 | Oakley | |
| 6,542,249 B1 | 4/2003 | Kofman et al. | |
| 6,552,829 B1 | 4/2003 | Maciey et al. | |
| 6,556,932 B1 | 4/2003 | Mestha et al. | |

OTHER PUBLICATIONS

Molecular Expressions Microscopy Primer. Introduction to CMOS Image Sensors. [online] Retrieved on Feb. 4, 2003. Retrieved from the Internet: http://www.micro.madnet.fsu.edu/primer/digitalimaging/cmosimagesensors.html. pp. 1-13.

Boyd Folwer et al., "A Method for Estimating Quantum Efficiency for CMOS Image Sensors". Information Systems Laboratory, Stanford University. pp. 1-8, Apr. 1998.

J.S. Lee, et al., "Improved One-dimensionsl Anaylsis of CMOS Photodiode Including Expitaxial-Substrate Junction". Department of Electrical And Compuyter Engineering, University of Waterloo, Ontario, Canada. pp. 1-4, 2001 IEEE CCD.

Kodak KAC-1310 Image Sensor—Image Sensor Solutions, Device Performance Specification. Nov. 7, 2002 Revision 4. Retrieved from the Internet: http://www.kodak.com/cluster/global/en/digital/ccd/products/cmos/KAC-1310/specifications.jhtml. pp. 1-76.

* cited by examiner

Primary Examiner—Aung S. Moe
Assistant Examiner—Heather D Gibbs
(74) Attorney, Agent, or Firm—Faegre & Benson, LLP (57) ABSTRACT

A method and apparatus are described for image sensor optimization. According to an embodiment of the invention, a method comprises capturing an image with an image sensor, the image sensor comprising a plurality of pixels; obtaining an output relating to the image from a first pixel of the plurality of pixels; and normalizing the output from the first pixel to correlate with photon flux striking the image sensor.

34 Claims, 10 Drawing Sheets

IMAGE SENSOR OPTIMIZATION

FIELD OF THE INVENTION

The invention relates generally to the field of imaging. More particularly, the invention relates to image sensor optimization.

BACKGROUND

In addition to other uses, optical image sensors are used, like traditional camera film, for analytical purposes. Among possible analytic uses for image sensors is the evaluation and characterization of light interactions between one or more substances on a surface or in a reaction vessel. Light emitted by the object of interest or absorbed by the object when a beam of light passes through it can be detected and quantified. Subjects of analysis may include microarray analysis in which molecules are attached to a matrix. Additional details regarding analysis using microarrays are disclosed in U.S. patent application Ser. No. 10/373,546 (now issued U.S. Pat. No. 6,861,251), by Lawrence R. Green, entitled "Translucent Solid Matrix Assay Device For Microarray Analysis" and filed on Feb. 24, 2003, the entire contents of which are incorporated herein by reference.

Complementary metal oxide semiconductor (CMOS) image sensors are used in digital cameras and are increasingly found in a variety of analytic instruments. CMOS image sensors are improving in quality and are challenging and replacing charge-coupled device (CCD) imagers for detecting low level spectral images.

Most modern light detectors are designed to capture a spectral signal by presenting a two-dimensional array of sensitive photodiodes towards a target. The photodiodes are designed to produce current when exposed to light, and the resulting current may be analyzed in various ways. Modern sensors convert the analog photodiode signal to a digital signal format that may then be stored and processed for later analysis.

Image sensors are often sensitive and responsive, acting to minimize background noise and interference. Image sensors are capable of accurately recording data regarding light striking the photodiode array of the sensor. High-resolution digital pictures may be produced pixel by pixel with an appropriate source of light, an optical system, an image sensor, and a computer. Using such a system, photographic pictures may be obtained in either monochromatic or color formats.

However, a photodiode will produce an analog output signal that correlates with the energy striking the photodiode array only in special circumstances, such as when the target is illuminated by monochromatic light at a particular wavelength. Even though the output signal of a photodiode is essentially linear with respect to the illumination applied to the photodiode, the signal value for a pixel does not generally correlate accurately with the photon flux. This is because the quantum efficiency (QE) for converting the photon flux to a photodiode electrical energy varies with certain factors. In addition, in most cases more than a single wavelength of light will strike a photodiode.

Every photodiode has a certain QE factor that will vary with factors such as wavelength and temperature. Photon flux represents the electromagnetic energy striking the surface of a two-dimensional array, and the QE represents the capability of the photodiode to convert that energy into electrical energy. QE is usually expressed as a percentage of the energy flux, equaling some percentage less than 100 percent. Because QE varies greatly with the wavelength of light illuminating a photodiode, comparisons of a signal at one wavelength to that at another are difficult to interpret unless the QE factors are known for all wavelengths that apply.

Further, most image sensors are designed by manufacturers to produce images that approximate the equivalent of what would be seen on a film or by the human eye. Manufacturers are interested in reproducing "life-like" pictures and colors. Manufacturers may provide access to the raw digital information for every pixel, but image sensors generally process that information before it is available for analysis to better render the "life-like" colors and intensities that represent human visual expectations.

For these reasons, the data produced by an image sensor generally does not directly relate to the photon flux that impinges upon the photodiode array of the sensor. This factor limits the usefulness of image sensors for analytic purposes.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements, and in which.

DESCRIPTION OF ILLUSTRATIVE EMBODIMENTS

Definitions

Before describing an exemplary environment in which various embodiments of the present invention may be implemented, some terms that will be used throughout this application will briefly be defined. Terms that are not otherwise defined herein are used in accordance with their plain and ordinary meaning.

As used herein, "a" or "an" may mean one or more than one of an item.

As used herein, "quantum efficiency" means the fraction of light or photon flux that is utilized or contributes to current or signal output for an imaging device.

As used herein, "image sensor", "imaging device", or "imager" means a device for capturing an image. The term includes, but is not limited to, a CMOS (complementary metal oxide semiconductor) image sensor and a CCD (charge-coupled device) imager.

As used herein, "photon flux" means the energy of photons striking a surface, including the surface of an image sensor. The energy striking a surface may be measured in watts per cm$^2$ and correlates with the number of photons striking a unit area over a given period of time.

Analysis using Image Sensors

When used for analytic purposes, the accuracy of an image sensor in accurately detecting and recording the photon flux striking the image sensor is of extreme importance. The use of the image sensor to produce visually pleasing results is not important for analysis, but this is a design factor of modern image sensors that may be used for analytic purpose. Under an embodiment of the invention, signals generated by an image sensor as a result of light striking the image sensor are optimized to produce data that more closely represents the actual photon flux. The outputs of pixels of the image sensor are normalized to correlate with photon flux.

Image Sensor Operation

Investigators using a photodiode detector may incorrectly assume that the digital data acquired from the detector correlates with the photon flux striking the detector because increases in the intensity of the signal out will generally directly correlate with increases in signal input in a particular wavelength or band-width. Because photodiodes are very linear in output, increases in the photon flux at different wavelengths over the photodiode surface will, over the photodiode's dynamic range, produce a linear output signal. However, the output data will not correlate with the photon flux if the QE is variable over the range of wavelengths that are striking the photodiode. For a particular number of photons striking a photodiode over a time period, a larger current will be produced by the photodiode at a first wavelength than a second wavelength if the QE for the photodiode is higher for the first wavelength than the second wavelength.

Restricting a light source for analysis to a narrow band by filtering or by using a laser light source generally will not resolve accuracy issues. Emission spectra that are evaluated using image sensors may be very broad even if the excitation source has a narrow wavelength range. For this reason, the shape of the QE curve for a photodiode should be carefully considered in evaluating output data from an image sensor.

With regard to the choice of image sensors, CMOS imager sensors are fundamentally different from charge-coupled devices and are increasingly used in microscopy and diagnostic instruments because they are cheaper to build and require considerably less power to operate. CCD cameras are no longer clearly superior in low intensity light situations, which had been true in the past.

CMOS images now rival traditional color imaging methods on film and are easily manipulated. The images may be transferred from one processor to another as a digital file in a variety of formats preserving the arrayed data pixel address. Manufacturers have devoted considerable energy reproducing "life-like" color image sensors using various color filters and interpolation methods to enhance a digital image rendering colors very close to the human eye experience. However, the pleasing "life-like" color pictures obtained with a color CMOS image sensor are not as useful for analytic procedures. Similar issues exist with monochromatic images unless the image is produced by light at single wavelength, which is rarely true.

Figure 1:
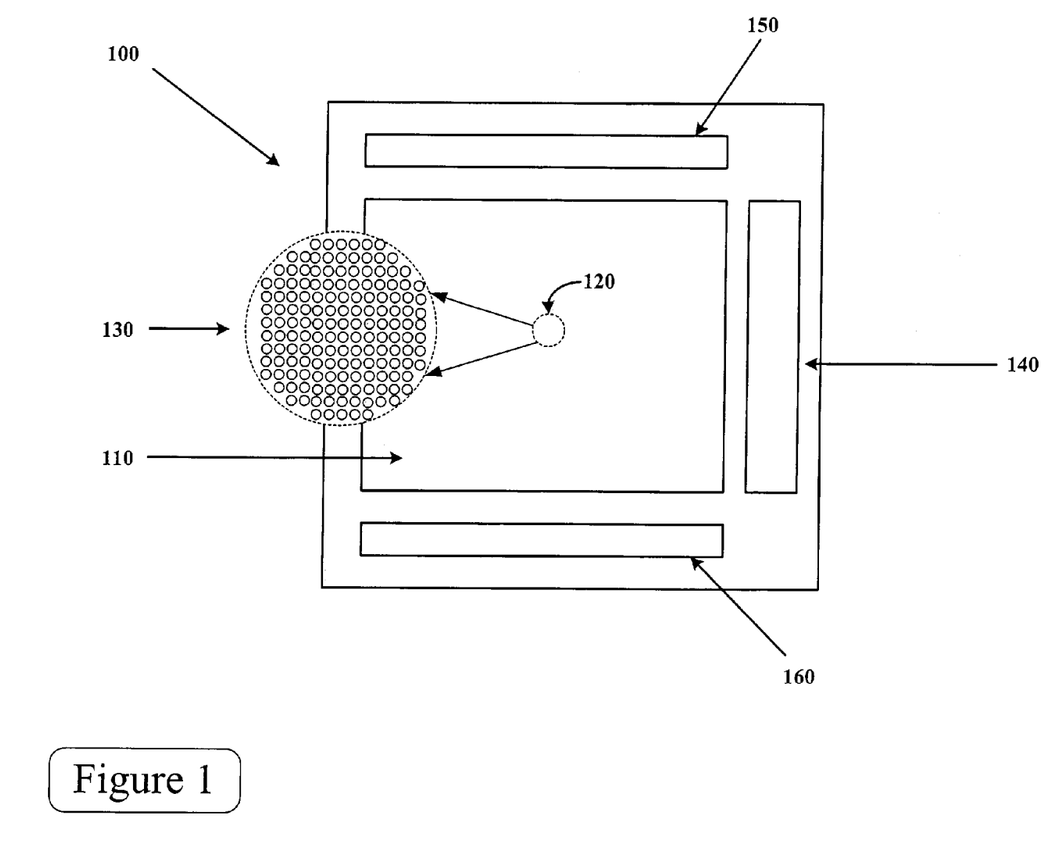
FIG. 1 is an illustration of a CMOS image sensor.

FIG. 1 is a simplified illustration of an example of a color CMOS image sensor that may be utilized in connection with an embodiment of the invention. Not all components and features of CMOS imagers are illustrated. FIG. 1 and the remaining figures below are for illustration and are not necessarily drawn to scale. In FIG. 1, an image sensor 100 includes an imaging array 110. The imaging array is comprised of a large number of pixels arranged in a two-dimensional array. As shown in the magnified pixel array 120 of a particular area of the array 120, there is a filter associated with each of the pixels in the imaging array 110. The image sensor 100 will also generally contain electronics relating to the processing and transmission of signals generated by the imaging array 110, including analog signal processing 140, analog to digital conversion 150, and digital logic 160.

The photodiode array in a CMOS color image sensor is blanketed by an ordered thin layer of polymeric filters, such as in a conventional Bayer RGB (red-green-blue) two-dimensional array. Each filter is sized to fit over an individual photodiode in a sequential (Bayer) pattern to capture color information from a broad bandwidth of incident illumination. In an RGB array, a heavy emphasis is placed on the green filters to address the human visual maximal response at 550 nm. There are 2 green filters for every red and for every blue filter. However, even though the human eye is more attuned to the green 550 nm region, yellow is generally a better choice with regards to QE factor.

CMOS image sensors and the integrated circuits that define the active pixel array are inherently monochromatic (black and white) devices that respond only to the total number of electrons striking the photodiodes, not to the color of light. Color is detected either by passing the light through a sequential series of filters (such as red, green, and blue filters), or with miniature transparent polymeric thin-film filters that are deposited over the pixel array.

Active pixel sensor (APS) technology is the most popular design for CMOS image detectors. In addition to a photodiode, each pixel (or imaging element) includes a triad of transistors on its surface that convert accumulated electron charge to a measurable voltage, reset the photodiode, and transfer voltage to a vertical column bus. The photodiode thus occupies only a fraction of the pixel area. The photodiode area encompasses an area equal to 30 to 80 percent of the total pixel area for most CMOS sensors. This area occupied by the photodiode is the area that absorbs photons, while the other parts of the pixel are relatively opaque, blocking, reflecting, or absorbing light. The photodiode area or window is referred to as the "aperture" or "fill factor" of the pixel or image sensor. A small aperture or fill factor results in a significant loss of sensitivity and a corresponding reduction in the signal to noise ratio and leads to a reduction in the dynamic range of the sensor.

CMOS image sensors can be utilized to produce pictures based upon the signals produced when photons strike the photodiode surface associated with each pixel in an active pixel sensor array. The pixel signals are processed to form the total picture either in monochrome (black and white) or color.

Monochrome CMOS imager sensors do not have color filters over the photodiode portion of the pixel. However, color CMOS imagers, even with standard Bayer pattern filters, generally are more sensitive than monochromatic CMOS imagers. While it may appear that inherently monochromatic CMOS photodiode without filters would be more sensitive because some light passing through a filter is absorbed and never reaches the photodiode in a color filtered photodiode, this is not generally true. This assumption does not fully take into account the effect a filter has on the QE for a photodiode, which might enhance certain signals, and ignores the advantages provided by microlenses in color photodiode architecture, which are described below. Monochromatic CMOS image sensors do not have a color filter and they do not normally have a microlenses over each pixel. These are important factors that make monochromatic imagers less attractive than color CMOS image sensors with regard to imager sensitivity.

Figure 2:
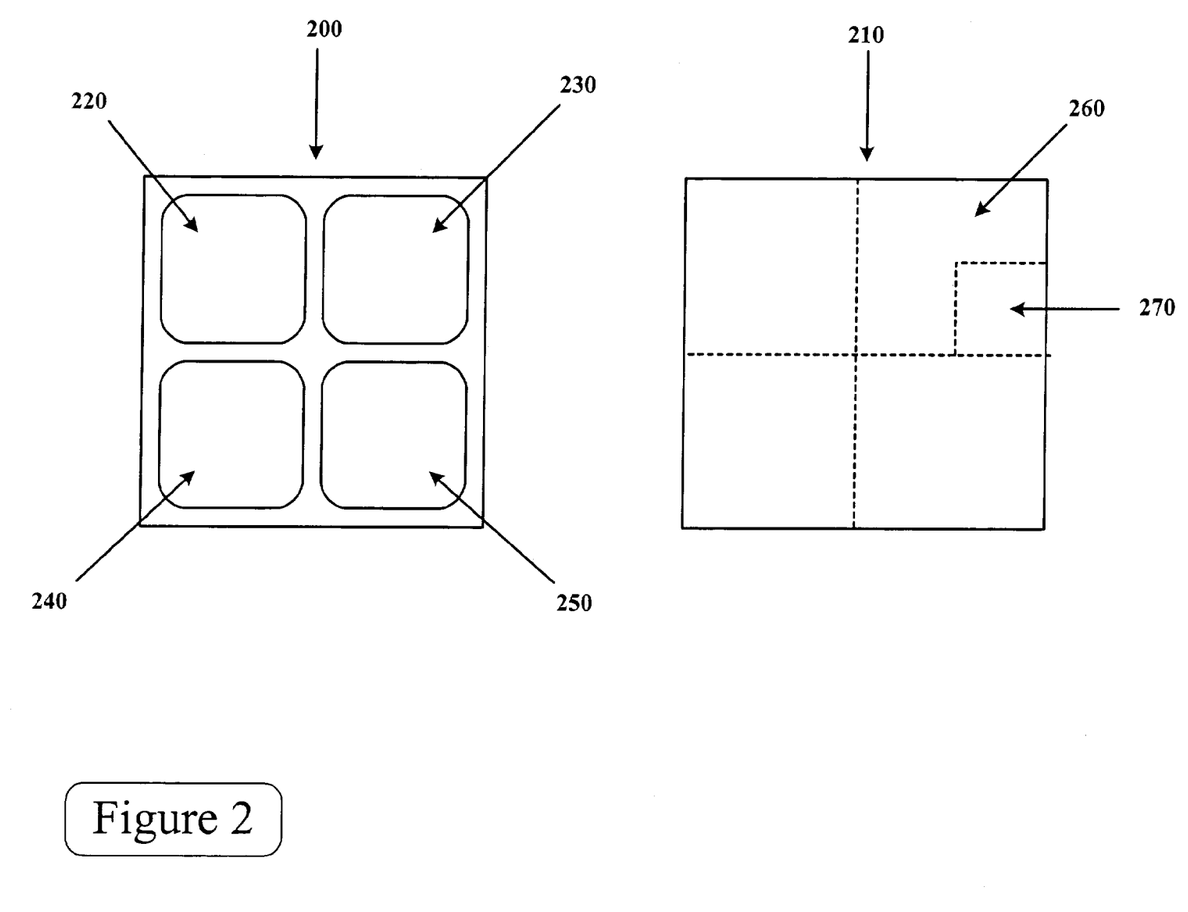
FIG. 2 is an illustration of a Bayer color filter mosaic array.

FIG. 2 illustrates a small section of an imaging array of a color image sensor that may be utilized in connection with an embodiment of the invention. The illustrated section repeats throughout the imaging array. The section 200 is comprised of four pixels, each having a filter. The filters 220-250 have colors based on the choices made for the array. Below the filters 210 illustrates the structure of the individual pixels. For each pixel, such as pixel 260, there is a portion that comprises the photodiode 270, the area of the photodiode being only a fraction of the total area. The image sensor will detect only the portion of the light falling on the photodiode area.

In color imagers used in analysis, one possible approach would be to construct imagers by carefully selecting filters and photodiodes to produce QE factors for a given bandwidth that is approximately constant. By combining an appropriate number of photodiodes in an array with chosen filters, the measurement of light energy would be more accurate. The filters chosen could assist in leveling and improving upon the QE factors. However, in practice the filters and photodiodes are chosen for other purposes, with a goal of producing the most visually pleasing images. In order to improve upon the quantum efficiency and spectral response, several CMOS manufacturers use color filter arrays based on the primary subtractive colors, cyan, magenta, and yellow (CMY), instead of the standard additive primaries red, green, and blue (RGB). CMOS image manufacturers generally use either Bayer RGB or Bayer CMY patterns that have been selected for photographic imaging.

Figure 3:
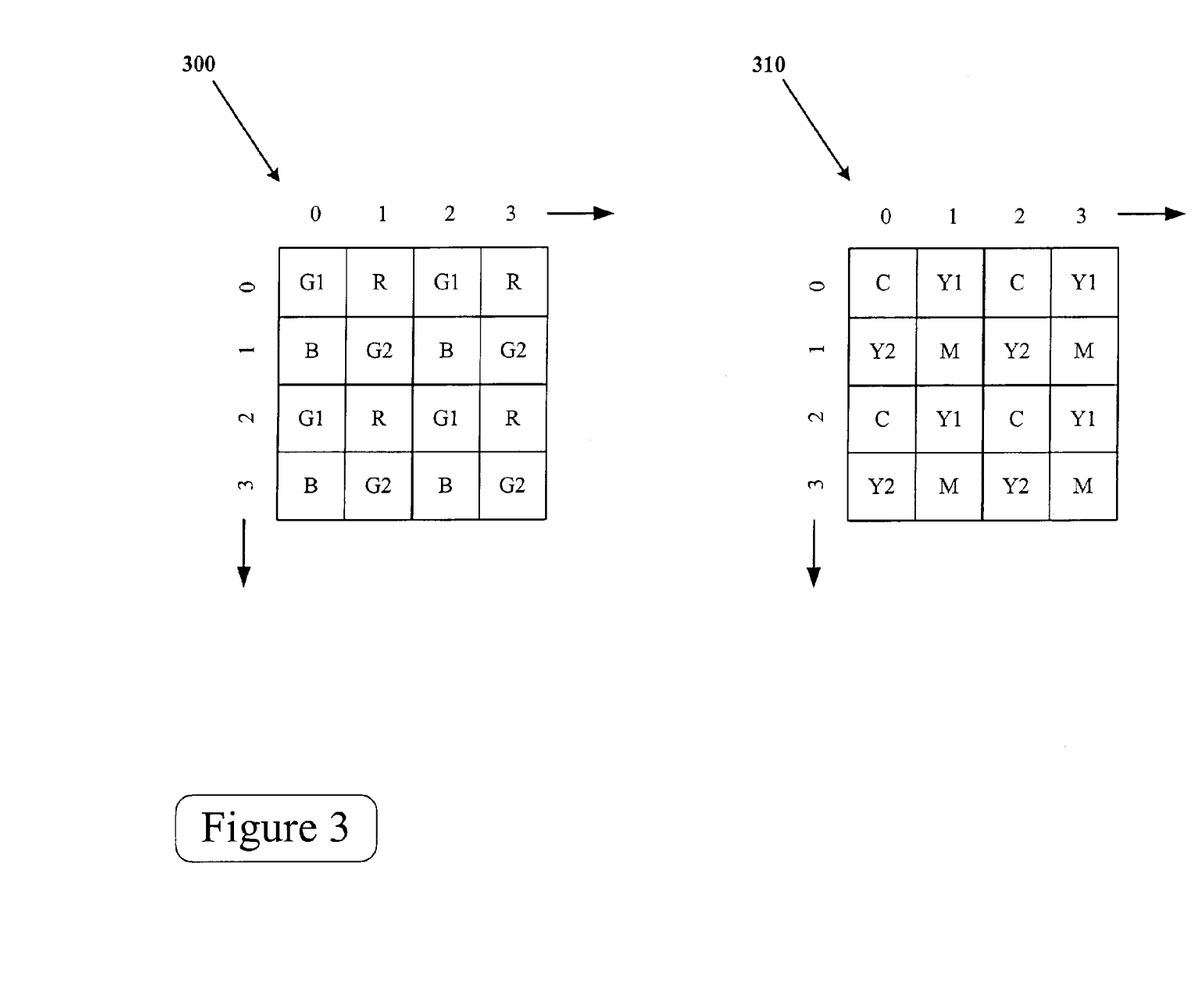
FIG. 3 is an illustration of possible filter arrangements for an image sensor.

FIG. 3 is an illustration of RGB and CMY filters. For these filters, an imaging array is divided into small arrays of filters, with each such array of filters having the same filter pattern. An RBG filter array 300 contains two-by-two arrays of filters, with each array containing a red filter and a blue filter for two diagonal pixels and two green filters for the remaining two diagonal pixels. A CMY filter array 300 also contains two-by-two arrays of filters, with each array containing a cyan filter and a magenta filter for two diagonal pixels and two yellow filters for the remaining two diagonal pixels. While the illustrated filters are the most common filter arrangements, many other filter colors and patterns are possible, and any filter pattern may be used in conjunction with an embodiment of the invention. Certain other alternative filter patterns that provide benefits in certain wavelength ranges are shown in Table 1.

TABLE 1

Alterative Color Filters for a CMOS Color Imager

| Wavelength Range (nm) | Filter Type | Modified Bayer Pattern |
|---|---|---|
| 510-810 | Yellow | Y,Y,Y,Y |
| 610-810 | Magenta | M,M,M,M |
| 490-550 | Cyan | C,C,C,C |
| 490-810 | Yellow, Cyan | Y,Y,Y,C |
| 350-550 | None | Monochrome pattern |

In contrast to monochrome image sensors, color CMOS image sensors also contain microlenses that effectively direct photons to the photodiode aperture. The bubble lens, generally including an anti-reflective coating, can effectively increase the surface area of a photodiode by a significant amount, approximately 60 percent in certain applications. The microlenses substantially increase the effective fill factor and may more than compensate for filters that cut down on the total light that can reach the photodiode.

Figure 4:
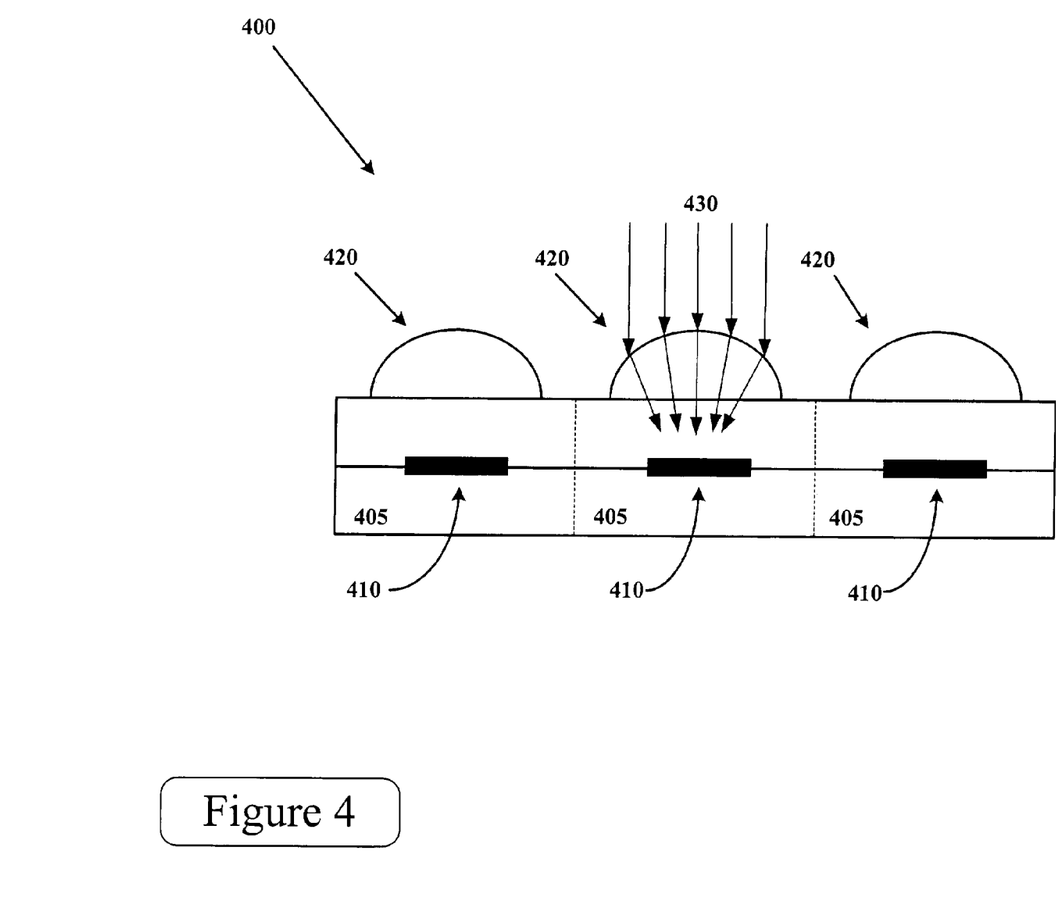
FIG. 4 is an illustration of microlens operation in an image sensor.

FIG. 4 is a simplified illustration of microlenses in an image sensor. Within the image sensor, there are multiple pixels 405. Each pixel contains an active portion 410, with the active portion including only a portion of the pixel area. In order to compensate in part for the light energy that would not normally strike any of the active portions 410, each of the pixels 405 has an associated microlens 420. The function of each microlens 420 is to focus more light energy on the active portion 410 and thus to allow measurement of a larger percentage of the incident photon flux. For example, light 430 strikes a microlens 420 and is focused on the active portion 405 of the pixel 410.

Image Sensor Optimization

Three primary mechanisms that reduce or hamper photon collection by the photosensitive area of an image sensor are absorption, reflection, and transmission. These factors are wavelength-dependent in nature, and define in part the quantum efficiency (QE) of the image sensor. For example, reflection and transmission of incident light occurs as a function of wavelength, with a high percentage of shorter wavelengths below 400 nm being reflected. Shorter wavelengths are absorbed in the first few microns of the photosensitive region but the longest wavelengths exceeding 650 nm often pass through the photosensitive region.

Figure 5:
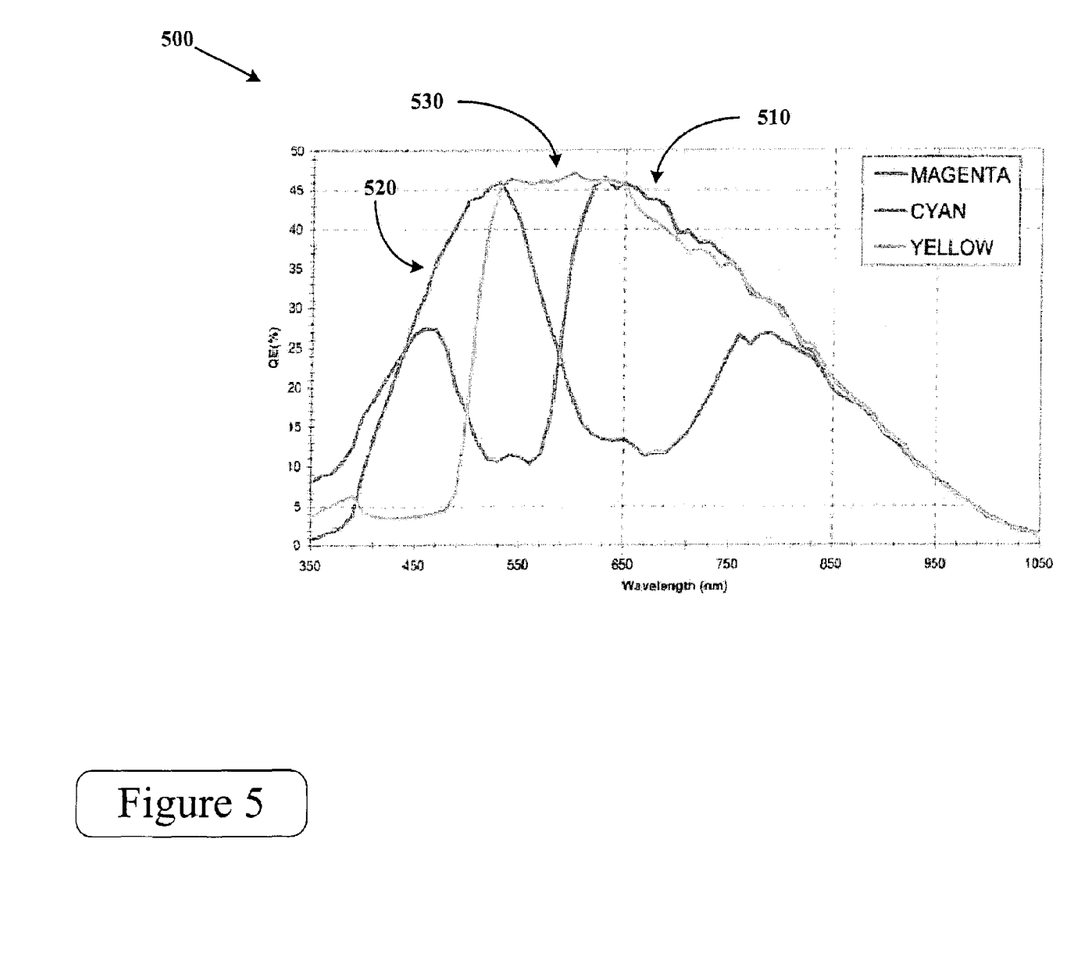
FIG. 5 is a graph of quantum efficiency of an exemplary image sensor.

FIG. 5 illustrates a typical quantum efficiency spectral response for an image sensor. For FIG. 5, a Bayer CMY filter is evaluated. The spectral response 500 illustrates the quantum efficiency of the image sensor for various wavelengths of light incident on the image sensor. There is an individual response curve for a pixel with a magenta filter 510, a pixel with a cyan filter 520, and a pixel with a yellow filter 530. Each curve has peaks and valleys at different wavelengths of incident light.

By examining the QE wavelength dependence curves for each filter type used in an image sensor, the output signal proportional to the photon flux can be determined for any wavelength or interval of interest, including those pixels for a monochromatic image sensor.

In many cases every pixel in an array is essentially identical to its neighbor except for the kind of filter (CMY, RGB, other pattern, or no filter). The effect of a filter is either to increase or to reduce the photodiode energy output for a given photon flux. The effect on the signal is wavelength dependent. The QE is the variable in the output signal that should be factored out of the equation if fair comparisons are to be made across the imaging array for each and every pixel.

In a CMOS imager, the pixel signal is obtained for each pixel as raw data after the analog to digital converter transforms the value for a set time interval. If QE is expressed as a fraction, the pixel signal is directly proportional to the product of the QE and Photon Flux:

$$\text{Pixel Signal} = \text{Constant} \times \text{QE} \times \text{Photon Flux}$$

Under an embodiment of the invention, if raw data can be normalized according to the appropriate QE, digital values can be created that may be used in subsequent analysis. The pixel value for a color CMOS image sensor is obtained before on chip conversion occurs and the value is normalized by multiplying each signal value for a particular color filter by the inverse QE.

For a relatively narrow bandwidth, the QE may be treated as a constant depending upon the wavelength and filter type used. In one example, the Bayer CMY pattern over the range 550 to 650 nm for a Kodak 1310 color CMOS image sensor provides a QE of approximately 46 percent, and then drops linearly from 650 nm to 5 percent at 990 nm, approximately 0.6 percent every 5 nm. In addition, the Magenta and Yellow filters are very similar over the range from 630 nm to 990 nm.

For a particular example with a CMY pattern Kodak 1310 color image sensor at 670 nm, the QE values are as shown in Table 2. A pixel with a yellow filter would have its digital raw data multiplied by 2.38, a magenta filter pixel by 2.27, and a cyan filter pixel by 7.69. In this embodiment, the signal for every pixel is effectively transformed to a numeric value that is directly proportional to the actual photon flux. It is noted that Table 2 only contains the QE for the image sensor when light of a particular wavelength (670 nm) strikes the image sensor. The QE for any other wavelength of light will vary, as shown in FIG. 5.

TABLE 2

Quantum Efficiency and Normalization Factors for Kodak 1310 Image Sensor at 670 nm

| Filter Type | Quantum Efficiency (%) | Normalization Factor |
|---|---|---|
| Yellow | 43 | 2.38 |
| Magenta | 44 | 2.27 |
| Cyan | 13 | 7.69 |
| Monochrome (no filter) | 28 | 3.57 |
| Red | 35 | 2.86 |
| Green | 5 | 20.0 |
| Blue | 3 | 33.3 |

QE Factor Correction

Corrections to account for differences in QE may be made based upon known QE factors for a particular filter type and wavelength. (For example, see the data contained in Table 1 and Table 2.) However, an image sensor may also be utilized to automatically correct for differences in pixel QE. Under an embodiment of the invention, each area of a sensor array, such as each filter quadrant, is normalized to render every pixel in the quadrant optimally tuned for photon flux in real time.

According to an embodiment, no corrections are made if the pixels and filters are all of the same type, as, for example, the YYYY, MMMM, and CCCC filter patterns shown in Table 1. A correction is made if there are two or more filter types in the array (e.g. filter patterns such as YYYC, RGB Bayer, or modified CMY Bayer). A method of auto correcting for QE can be used for any combination of two or more filter and photodiode types and such method corrects to normalize the 4 pixels in a quadrant so that each pixel produces an equivalent output signal.

If the pixels are tightly packed in a quadrant relative to the change in photon flux over a given region of the array, then it can be assumed that the same number of photons are striking each pixel in the quadrant at any given moment. With the currently available high-resolution sensors, and with anticipated future improvements in resolution, the assumption that neighboring pixels in any given quadrant experience identical photon flux is appropriate. Using this assumption, each of the pixels in the quadrant should produce the same output. According to an embodiment, auto correction causes adjacent neighbors in each filter quadrant identical. The most sensitive pixel type in a quadrant is used to factor out QE and wavelength differences, which simplifies the problem of correcting for wavelength and bandwidth dependence. Auto correction also reduces or eliminates problems related to temperature variations for different filter and photodiode types.

In one example, an array of an image sensor comprises multiple filter quadrants. Two or more filters are used in each quadrant of 4 pixels. In each quadrant of 4 pixels, the average analog to digital converted signal output for each filter and photodiode type is determined. If, for example, there are 3 yellow filtered pixels and 1 cyan filtered pixel in the quadrant, the average for the 3 yellow pixels is determined first. The output value for the yellow pixels is then compared to the value for the cyan pixel to determine which output is numerically greater. Under the embodiment, there is an assumption that all 4 pixels receive equivalent photon flux. The highest output value is assigned to all four pixels in the quadrant. The next quadrant in the array may then be corrected in the same manner, with the process continuing until the entire array has been assigned corrected output values to correlate with photon flux.

The process of auto correction is repeated over time as an image sensor is used to record images. In an example, the wavelength of light received by an image sensor may change from a first wavelength to a second wavelength. A first type of filter may provide the highest QE for the first wavelength, while a second type of filter provides the highest QE for the second wavelength. The change in wavelength is included in the calculation process and therefore auto correction for changing light can be made in real time.

Under an embodiment of the invention, it is not necessary to know in advance the QE for each filter type to auto correct for QE differences. Auto correcting the sensor based on the photon flux at the time an image is obtained optimizes the photo image to correlate with photon flux. This method of correcting the signal removes temperature and wavelength dependence differences for different filter types and can be implemented using software. Such method thus automatically corrects for a broad band signal impinging upon an image sensor.

Under an embodiment of the invention, the digital signals produced by an image sensor auto corrected for photon flux may be rendered to a gray scale image for subsequent visualization in a monochromatic representation.

Image Sensor Calibration

Under an embodiment of the invention, the optimization of an image sensor can first be calibrated. The calibration can be accomplished by illuminating the color filters and photodiodes with light of known wavelength and intensity. For a color CMOS imager, the raw data for each filter is obtained and compared to expected values. From the resulting comparison, the QE and the multiplier (normalization factor) that is required to obtain the equivalent output signal for each color filter used for each and every pixel in the array may be obtained.

Optimized signals obtained using QE factor conversions can more accurately relate the signal to the photon flux, and therefore more precisely characterize events, such as the optical events related to excitation-emission spectra or absorption phenomena in a chemical reaction. Both sensitivity and accuracy are enhanced by properly converting the signal to account for QE factors.

Using a standard CMOS imager (such as a Kodak 1310 color CMOS image sensor,) in an embodiment of the invention, raw data produced may be processed for signal optimization. The signal is converted to a numeric value that correlates with the photon flux incident upon the imager. This process can be applied to either a color or monochromatic CMOS imager sensor to render the signal proportional to photon flux.

Data processed according to this embodiment may be rendered for visualization, such as via a gray scale standard (0 to 255 monochromatic) to producing a black and white image that correlates with the actual photon flux. The visual image of the data is superficially equivalent to a gray scale monochromatic image sensor, but for an equivalent luminance will be more intense than a image produced by a monochromatic non-transformed CMOS counterpart because color CMOS chips are generally more sensitive than monochrome chips. A color image sensor generally provides a better signal and is more sensitive than a monochromatic imager because the pixel photodiode filters improve upon the QE for the photodiode. The filtering of light by a color image sensor may be corrected using the QE factors to convert the signal to a number that is directly proportional to the photon flux. Further, advantage then is taken of the color filter's microlens for every pixel effectively amplifying the aperture for the photodiode.

Illustrations of Processes

Figure 6:
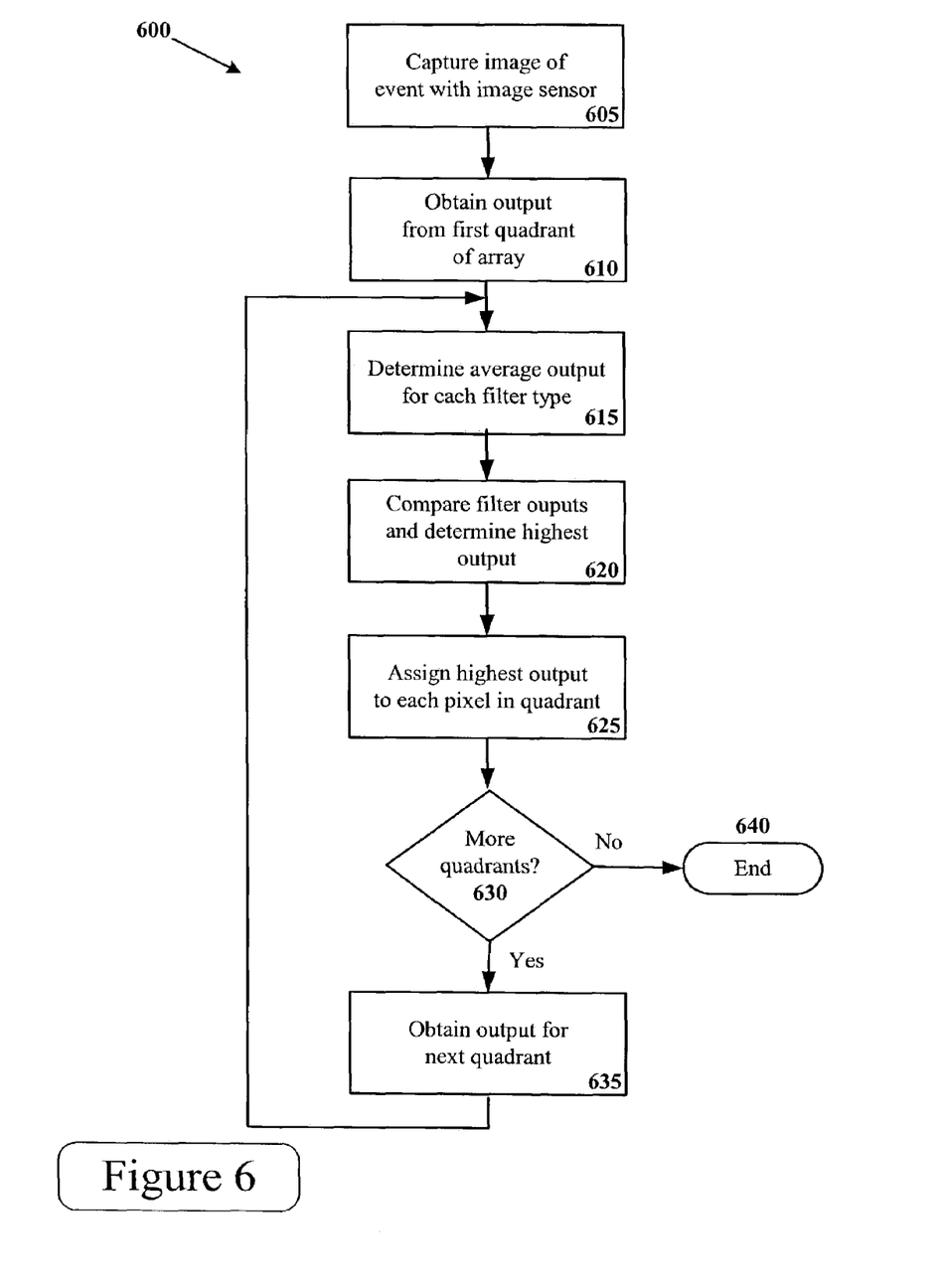
FIG. 6 is a flow chart illustrating an embodiment of correction of QE factors.

FIG. 6 is an illustration of an embodiment of correction of QE factors for an image sensor. In the correction process 600, an image of an event is captured with an image sensor. In this illustration, the image sensor is a color sensor containing an array of pixels, with each pixel having a filter. In this case, the filters are arranged in quadrants, with each quadrant having a particular filter pattern. However, embodiments of the invention are not limited to any particular type of image sensor or filter arrangement.

In FIG. 6, the outputs of each of the pixels within a first quadrant of the array are obtained 610. The average output of for each filter type in the quadrant is then determined. In one example, if a filter quadrant is CMY pattern containing a cyan filter, a magenta filter, and two yellow filters, the cyan output, the magenta output, and the average of the two yellow outputs are determined. The outputs are then compared and which output is highest is determined 620. The highest output is then assigned to each pixel in the quadrant 625. For example, if the average yellow output is the highest output for the CMY quadrant, indicating that, under the particular conditions, the yellow filter has the highest QE factor, then the average yellow output is assigned to each of the pixels in the quadrant. If there are more quadrants in the array 630, the output of the next quadrant is obtained 635 and the process continues. Once the final quadrant has been corrected the process is completed 640 and the corrected output for the array is available. The process can then be repeated over time to allow real time QE factor correction for the image sensor.

Figure 7:
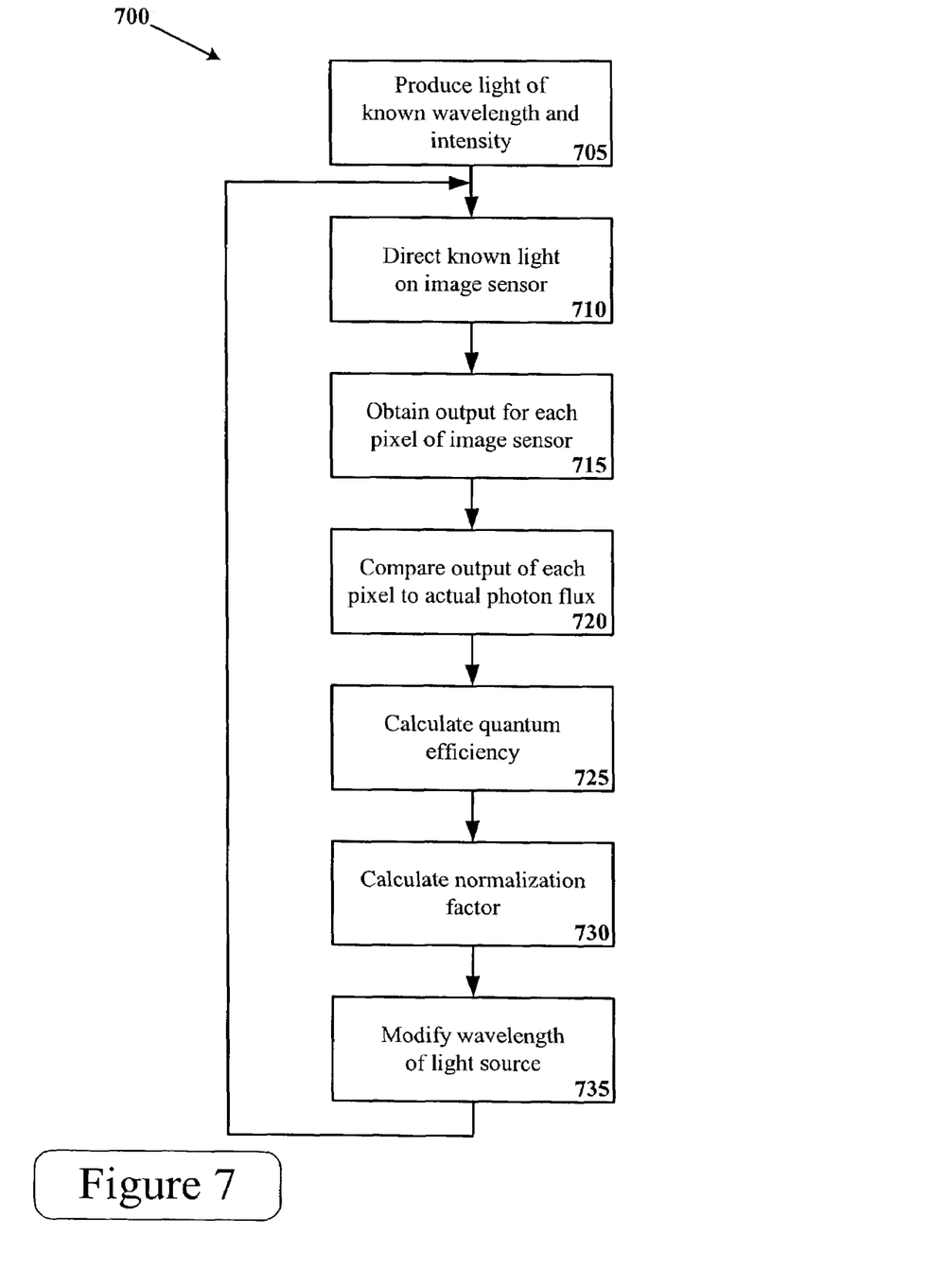
FIG. 7 is a flow chart illustrating an embodiment of calibration for image sensor optimization.

FIG. 7 is an illustration of an embodiment of a process for calibration for optimization of an image sensor under an embodiment of the invention. In the calibration process 700, a light of a known wavelength and intensity is produced 705. With a known intensity, the photon flux on each pixel is known, which would be the output if the QE of a pixel were 100 percent. The known light is directed on an image sensor 710. The output of each pixel of the image sensor is obtained 715. The output of the image sensor then can be compared with the actual photon flux 720. Using the comparison, the quantum efficiency of the pixel can be calculated 725, and then a normalization factor is calculated based upon the quantum efficiency 730. For a color CMOS image sensor, the comparison and calculation can be done for each filter color, resulting in a normalization factor for each filter color. In other embodiments, the comparison and calculation can be made for each pixel of an image sensor or for sectors of pixels of an image sensor, resulting in normalization factors that apply for certain portions of the image sensor. As the normalization factor varies for each wavelength of light that strikes the image sensor, the wavelength of the known light is varied 735 and the process repeats for each needed wavelength.

Figure 8:
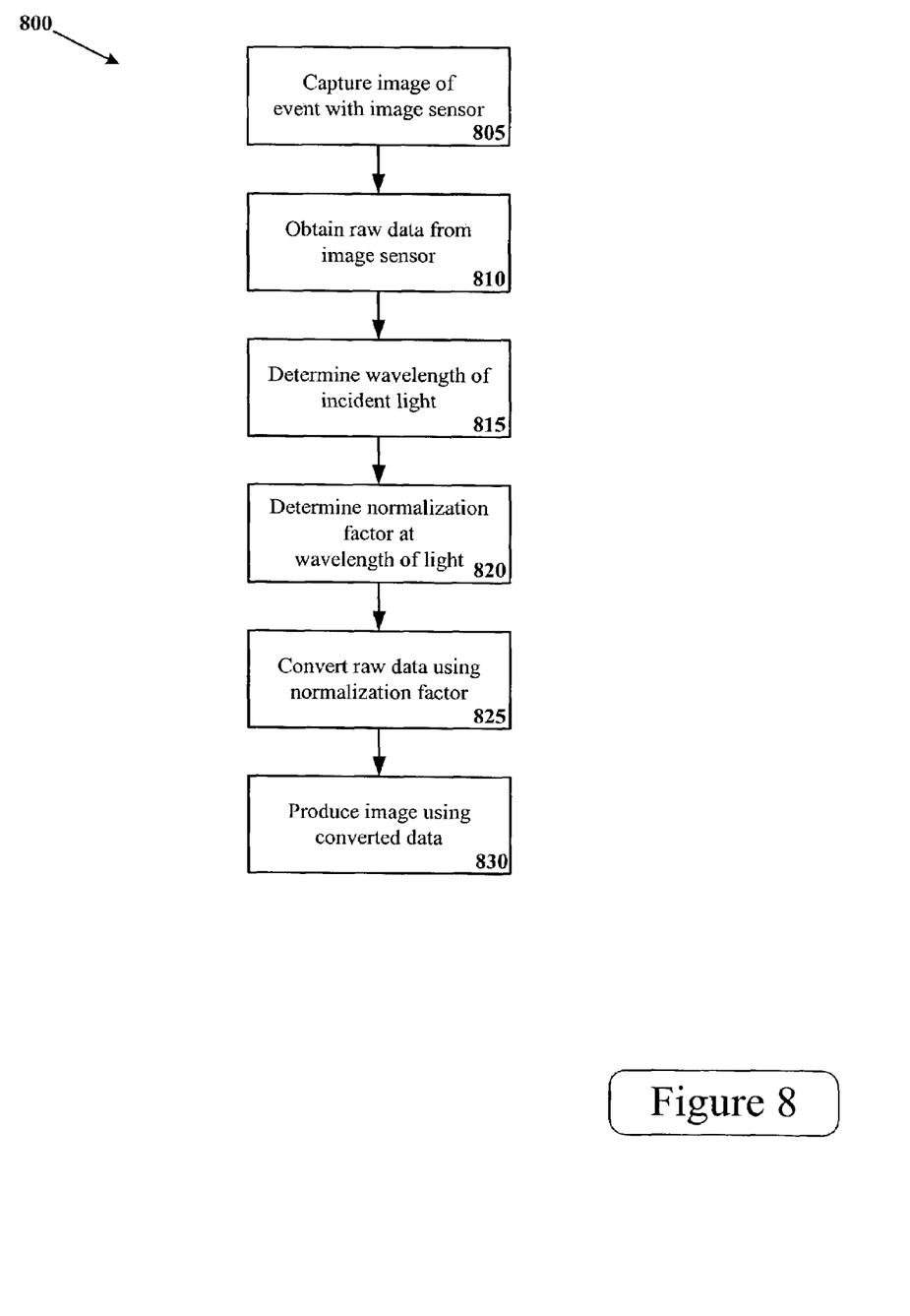
FIG. 8 is a flow chart illustrating an embodiment of image sensor optimization.

FIG. 8 is a flowchart illustrating an embodiment of the optimization of an image sensor under an embodiment of the invention. In the optimization process 800, an image of an event is captured with an image sensor 805. Under one embodiment of the invention, the image sensor is a color CMOS image sensor utilizing a filter pattern such as a Bayer RGB or CMY pattern. The raw data for the image of the event is obtained from the image sensor 810. The raw data is non-optimized data that, due to the nature of the image sensor, will generally vary greatly from the actual photon flux that struck the image sensor. As the normalization factor depends on the wavelength of light, the wavelength is determined 820. The appropriate normalization factor is determined for each pixel based upon the wavelength of light. For one embodiment utilizing a color CMOS image sensor, a normalization factor for each lens color is used in normalization. Under other embodiments, the normalization factors may vary based on other factors. The raw data is then converted using the appropriate normalization factors for the pixels of the image sensor 825, thus producing an optimized data set that approximates the actual photon flux for the captured image of the event. Under an embodiment of the invention, an image may be produced using the converted data 830.

Computer Operation

Figure 9:
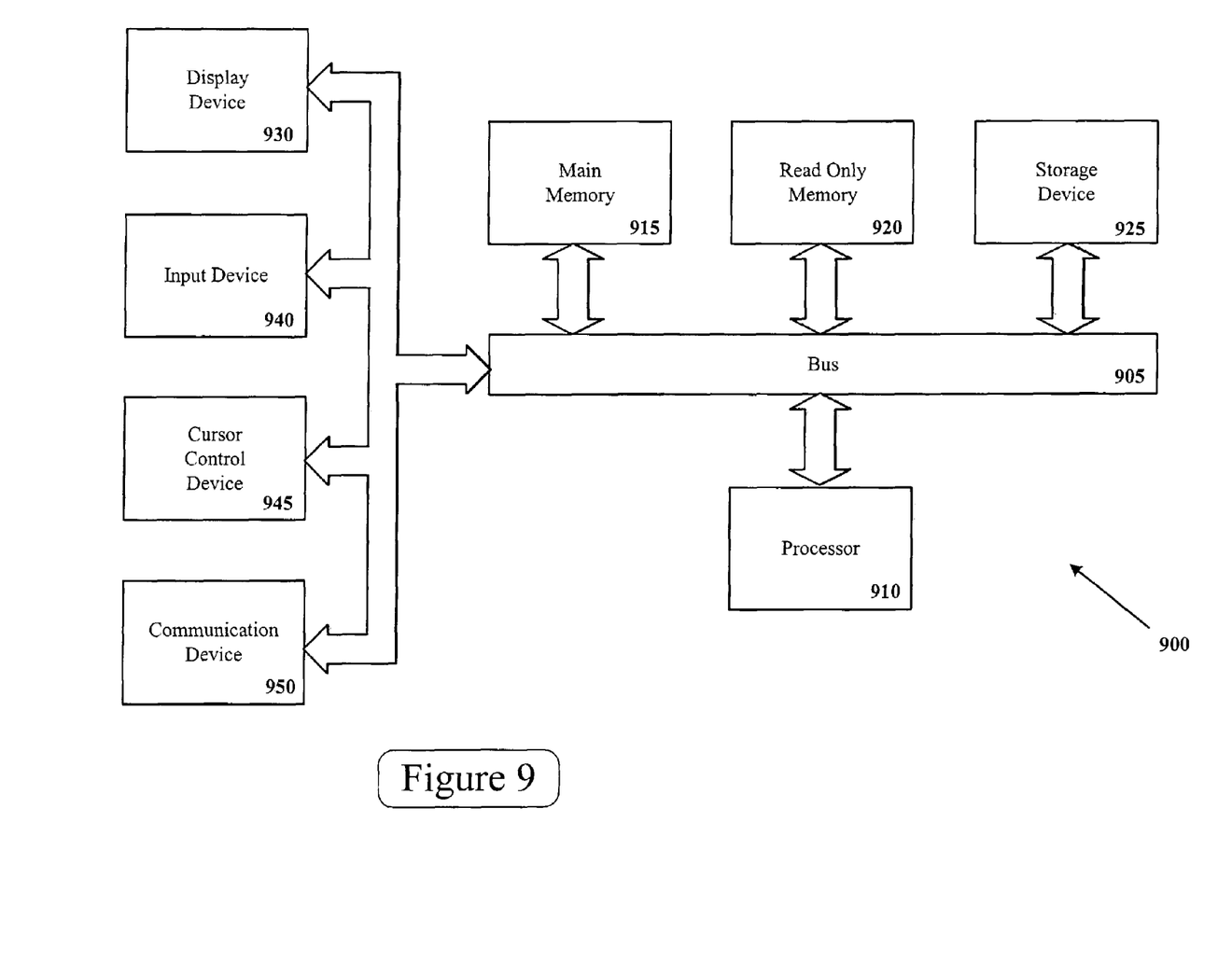
FIG. 9 is a block diagram illustrating an exemplary computer that may be utilized in connection with an embodiment of the invention.

FIG. 9 is block diagram of an exemplary computer that can be used in conjunction with an image sensor in an embodiment of the invention. While FIG. 9 illustrates a computer that may be connected to the image sensor, in other embodiments the function of the components shown may be structured in varying manner or may be performed by different systems. In some embodiments some signal processing functions may be performed by the image sensor or by components coupled with the image sensor. In some embodiments an imaging system may include most or all functions in a single unit. Not all computers are structured as shown in FIG. 9. In addition, certain computers may utilize elements shown in FIG. 9 as auxiliary devices that are external from the computer.

Under an embodiment of the invention, a computer 900 comprises a bus 905 or other communication means for communicating information, and a processing means such as a processor 910 coupled with the bus 905 for processing information. The computer 900 further comprises a random access memory (RAM) or other dynamic storage device as a main memory 915 for storing information and instructions to be executed by the processor 910. Main memory 915 also may be used for storing temporary variables or other intermediate information during execution of instructions by the processor 910. The computer 900 also may comprise a read only memory (ROM) 920 and/or other static storage device for storing static information and instructions for the processor 910.

A data storage device 925 may also be coupled to the bus 905 of the computer 900 for storing information and instructions. The data storage device 925 may include a magnetic disk or optical disc and its corresponding drive, flash memory or other nonvolatile memory, or other memory device. The computer 900 may also be coupled via the bus 905 to a display device 930, such as a liquid crystal display (LCD) or other display technology, for displaying information to an end user. In some environments, the display device may be a touch-screen that is also utilized as at least a part of an input device. In some environments, display device 930 may be or may include an auditory device, such as a speaker for providing auditory information. An input device 940 may be coupled to the bus 905 for communicating information and/or command selections to the processor 910. In various implementations, input device 940 may be a keyboard, a keypad, a touch-screen and stylus, a voice-activated system, or other input device, or combinations of such devices. Another type of user input device that may be included is a cursor control device 945, such as a mouse, a trackball, or cursor direction keys for communicating direction information and command selections to processor 910 and for controlling cursor movement on display device 930.

A communication device 950 may also be coupled to the bus 905. Depending upon the particular implementation, the communication device 950 may include a transceiver, a wireless modem, a network interface card, or other interface device. The computer 900 may be linked to a network or to other devices using the communication device 950, which may include links to the Internet, a local area network, or another environment.

Fluorescence Detection

Fluorophores are frequently used to detect the presence or absence of a coupled reaction on a glass surface. Fluorescence detectors measure the intensity of the evanescent wave produced when a fluorophore is excited with a laser or other light source. Typically the laser is used to excite the fluorophore at its absorption peak and the detector is tuned to read the emission signal at a longer emission wavelength, which is characteristic of that particular fluorophore. The shift in wavelength between absorption and emission is referred to as the Stokes shift. Most fluorescence detection methods use fluorophores with a large Stokes shift so that the emission and absorption curves are well separated. With fluorophores that have a small Stokes shift, it is necessary to excite at a shorter wavelength than the optimal peak absorption maximum because of overlap between the emission and absorption curves. The signal emission intensity is reduced and the sensitivity for detecting target molecules is decreased. The need for a large Stokes shift also limits the choices of fluorophores that can be used.

Because the curves for absorption and emission are frequently very near to one another, accurate reading of the emission signal may be complicated. If the distance between the emission and absorption curves is small, it is difficult to separate the light from an emission spectrum from that of the absorption signal. Lasers with a narrow band at the absorption peak are frequently used with filters to cut out all light up to a certain critical point just below the emission spectral curve. By selecting an appropriate long pass filter, band pass filter, or combination of long pass and band pass filters, the emission signal can be observed in a narrow window, eliminating much of the interference from the excitatory light source. Interference from the excitatory light source is also avoided by aligning the detector and apparatus so that the emission signal can be read at a large incident angle to the excitation beam. Although filters eliminate most of the signal from the excitatory light source, they also cut out a significant portion of the evanescent (emitted) signal. Most band pass filters cut out as much as 40 to 50% of the emission signal. Long pass filters may cut an additional 10% of the emission signal.

Fluorescent detection is used in a number of common test methods. DNA hybridization is commonly analyzed in this manner, using an appropriate fluorophore coupled to a set of known oligonucleotides that hybridize to capture oligonucleotides affixed to a slide. Sandwich immunoassays also employ this method of analysis, either using a tagged secondary antibody that binds to a primary antibody, or using a secondary biotinylated antibody and an avidin-fluorophore as the tag. Many variations on this method are well known.

Figure 10:
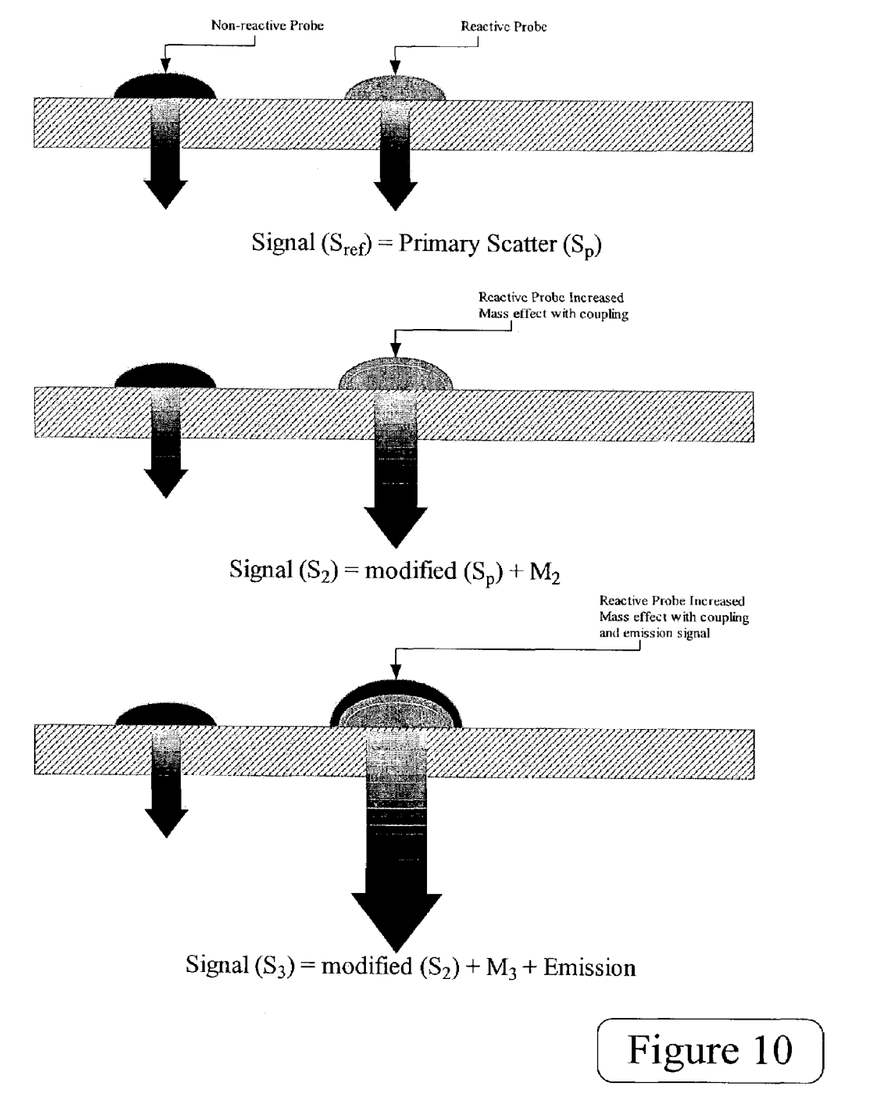
FIG. 10 is an illustration of light scattering detection.

Various other types of light interference may occur in fluorescent detection. Light scatter occurs by reflection of the excitation beam, while light dispersion occurs by reflection and bending of the excitation beam. Scatter and dispersion may represent a large part of the light striking a detector. In general, when a substance (such as a protein, nucleic acid or other biomolecule) is affixed to the surface of a glass slide, it acts as a mirror to reflect and scatter light in a variety of directions. The amount of surface covered and the mass or density of the attached material may greatly affect the amount of scattered light. The chemical composition of proteins, oligonucleotides or polymers attached to the glass surface may also affect the scattered light, as seen in FIG. 10 described below. In addition, the material attached to the glass surface material may itself fluoresce. The glass used may also have surface irregularities that can affect the signals received by the detector. The energy absorbed across the glass may vary from one spot to another, making signal analysis very problematic. Such problems require the use of novel methods of fluorescent detection and/or data analysis.

Evanescent Emission and Scattered Light

Evanescent signals are generally very weak and light scatter is intense, making accurate quantitative detection of analytes problematic. Light scatter is frequently assumed to be eliminated by filters. However, scattered light is almost always present and can be a significant part of the total signal reaching a detector. Filters used to remove light scatter also remove much of the target emission signal, thereby decreasing detector sensitivity. Filters may also transmit a small amount of scattered light. If the scattered light is relatively large compared to the evanescent emitted light, the detected signal will be a combination from several sources, only one of which represents target molecule binding.

The components of light scattering are illustrated in FIG. 10. Two spots (e.g., different antibodies) are deposited on a glass surface. During a method to detect a target, one of the spots remains totally non-reactive. The other spot reacts with a target, such as a bacterial pathogen and/or other reagents. Target binding to the reactive antibody increases the mass attached to the spot and results in a larger surface area and a change in molecular structure at the spot. A mass effect has occurred. The light scatter from the reactive spot will be different from the light scatter before target molecule binding. A sensitive photon-counting detector could detect this difference in scatter. A variety of instruments, such as certain flow cytometers and turbidity meters take advantage of scatter to quantify the amount of material in a solution. Those instruments measure the angle of scatter for a beam of light impinging on a target material. The change in signal is the difference between the reference signal ($S_{ref}$) and signal 2 ($S_2$). In FIG. 1, the $S_2$ signal is shown as having two components, a modified scatter signal plus a mass effect signal of the coupled pathogen. The signal from the reactive spot changes while the signal from the non-reactive spot signal is constant.

$\Delta S(\text{non-reactive spot}) = 0$ $\Delta S(\text{reactive spot}) = \text{Modified}(S_p) + M_1 - S_{ref}$ If the mass effect is sufficient to cause a large scatter effect, the fluorophore used for target detection could be eliminated. For example in DNA hybridization experiments, the mass attached to a surface using standard oligonucleotide probes (about 24 nucleotides in length) may be increased by a factor of 2 or more upon binding of target nucleic acids. Such a large change in mass may be detectable by monitoring light scatter instead of evanescent waves. In the case of a sandwich immunoassay with a biotinylated secondary antibody, another mass effect occurs when the biotinylated antibody binds to the pathogen. A third mass effect occurs when avidin-conjugated fluorophore binds to biotin.

The most sensitive signal may be obtained by subtracting the initial reference signal from the final captured signal, obtained after the fluorophore has been attached and excited. That signal represents the modified accumulated mass effects and the emission signal for the reactive spot.

$\Delta S(\text{reactive spot}) = \text{Modified accumulated mass effects} + \text{Emission} - S_{ref}$ This method of analysis can be used with a CMOS imager or any known digital imaging method that allows storage of pixel images for subsequent processing. The signal obtained from each spot will contain more useful information and will show a more intense change upon target binding if a proper subtraction method is used. The scatter effect may be turned to an advantage in detecting target binding. Moreover, it is unnecessary to have fluorophore emission and absorption curves well separated, since spurious signals are subtracted out of the image. The full intensity of an emission signal may be measured without reducing emitted light by with filters.

A subtraction method also eliminates artifacts and defects that may derive, for example, from inhomogeneity (chips, flaws) in the glass slide surface. The non-reactive spots completely blank out and do not appear as a signal.

Because CMOS imagers and pixel capturing devices in general exhibit a random, very low level noise there are limits as to what kinds of signals can be detected. At any given point in time, the baseline reference may exhibit a random number of spikes. A weak signal falling between two spikes would not normally be detected against this background noise.

The signal-to-noise problem may be improved if numerous images are captured and added one upon the other. Because the random spikes inherent in a detector such as a CMOS imager are constantly shifting about, accumulating the frame images will tend to average out the random noise. However a weak signal from the emission of an excited fluorophore does not change its pixel location. Therefore, an accumulated signal caused by target binding will increase with time. This method is similar to taking a photoimage of a distant star or galaxy, by tracking the object as it moves across the sky. The object of interest appears brighter against the background with time because the signal has accumulated at the same spot on the detector, while the background light averages out.

Method of Analysis

In an exemplary embodiment of the invention, a glass slide or other matrix array is secured on a stage. A fluidic cube is attached to the surface of the glass and used to deliver samples, second antibodies and other reagents. Before target molecule binding, an excitatory laser is focused on one end of the glass slide at an inclined angle about 30 to 40 degrees. The glass slide acts as a waveguide to conduct the excitatory light to spots, containing bound primary antibody, on the glass surface. A CMOS imager is used to capture the light signals. The CMOS chip is located beneath the glass slide and is aligned so that spots on the slide are directly above the imager and are sharply focused on the imager surface with optical lenses and apertures. Exemplary microarrays that are of potential use in analysis are disclosed in U.S. patent application Ser. No. 10/035,367, entitled "Method for Luminescent Identification and Calibration" and filed Dec. 28, 2001, the entire contents of which are incorporated herein by reference. A non-limiting example of a fluidics cube type biosensor is disclosed in U.S. patent application Ser. No. 09/974,089, entitled "Portable Biosensor Apparatus with Controlled Flow" and filed Oct. 10, 2001, the entire contents of which are incorporated herein by reference.

A number of pictures are taken. Each picture represents a single frame. For example 10 frames are taken using a 50 millisecond exposure. The exposure is selected so that the amount of light captured in a single frame is within the sensitive range for the camera. The 10 digital frames are then added to provide a reference set that is used for subtraction of unwanted (background) signals. The accumulated image is referred to as the calibration slide.

The fluidic cube is used to expose primary antibody to a sample, bind any target molecules to the first antibody, and bind second antibody to the target. The process ends with binding of avidin-fluorophore to the biotinylated second antibody and a final set of washes. The same number of frames used to obtain the reference slide image are taken of the sample slide, using the same exposures. The cumulative set of frames is referred to as the sample slide image. The luminescent signal for each spot is determined by subtracting the reference slide image from the sample slide image. This process essentially eliminates background noise and matrix array artifacts, resulting in very sensitive detection of target molecules.

In alternative embodiments of the invention, pictures may be obtained in either still frame or video mode. A typical video frame runs at 2000 ms and captures 100 frames each for the reference and sample analysis. This method removes artifacts and non-reactive spots, leaving only those signals that represent target molecule binding to the array.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   (a) capturing an image with an image sensor, the image sensor comprising a plurality of pixels;
   (b) obtaining an output relating to the image from a first pixel of the plurality of pixels, wherein the first pixel is included within a sector of the array, the sector containing a plurality of pixels; and
   (c) normalizing the output from the first pixel to correlate with photon flux striking the image sensor, wherein normalizing the output from the first pixel comprises:
      (i) obtaining an output from each pixel in the sector;
      (ii) determining an average output value for each type of pixel in the sector;
      (iii) determining which of the average output values for the pixels in the sector is the highest; and
      (iv) assigning the highest average output value to each of the pixels in the sector.

2. The method of claim 1, wherein normalizing the output from the first pixel comprises:
   determining a normalization factor for the first pixel; and
   converting the output of the first pixel to a photon flux value for the first pixel using the normalization factor.

3. The method of claim 2, wherein the normalization factor for the first pixel is based at least in part on the wavelength of light striking the first pixel.

4. The method of claim 3, wherein the image sensor includes a first filter, the first pixel being associated with the first filter, and wherein the normalization factor for the first pixel is based at least in part on a color of the first filter.

5. The method of claim 4, further comprising calibrating the normalization factor prior to capturing the image.

6. The method of claim 5, wherein calibration of the normalization factor for the first pixel includes:
   directing a light on the first pixel, a wavelength and an intensity of the light being known;
   capturing an image of the light using the image sensor;
   obtaining data from the first pixel relating to the image of the light;
   comparing the data from the image sensor to an expected value for the light; and
   calculating the normalization factors based at least in part on the comparison of the data from the first pixel with the expected value for the light.

7. The method of claim 1, wherein the type of each pixel is based at least in part on a color of a filter for each pixel.

8. The method of claim 1, wherein the image sensor is a complementary metal oxide semiconductor (CMOS) image sensor.

9. The method of claim 8, wherein the image sensor is a color image sensor.

10. The method of claim 9, further comprising producing an image based on a normalized output for each pixel in the plurality of pixels.

11. The method of claim 10, wherein the image is a monochrome image.

12. The method of claim 1, wherein the image sensor comprises a lens to increase light incident on the first pixel.

13. An imaging system comprising:
   (a) an image sensor, the image sensor comprising an array, the array comprising a plurality of pixels, each pixel in the array producing an output, wherein the array includes a first sector comprising a portion of the array, the first sector including two or more of the pixels in the plurality of pixels; and
   (b) a processor to normalize the outputs of the plurality of pixels to correlate with photon flux striking the image sensor, wherein normalizing the outputs of the plurality of pixels comprises:
      (i) obtaining an output from each pixel in the sector;
      (ii) determining the average value for each type of pixel in the sector; and
      (iii) assigning the highest average value to each of the pixels in the sector.

14. The imaging system of claim 13, further comprising a memory, the memory including a plurality of normalization factors for the image sensor, the processor using the normalization factors to normalize the outputs of the plurality of pixels.

15. The imaging system of claim 14, wherein the plurality of normalization factors are based at least in part on the wavelength of light striking the image sensor.

16. The imaging system of claim 13, wherein the type of each pixel is based at least in part on a color of a filter for each pixel.

17. The imaging system of claim 13, wherein the image sensor is complementary metal oxide semiconductor (CMOS) image sensor.

18. The imaging system of claim 17, wherein the image sensor is a color image sensor.

19. The imaging system of claim 13, wherein the image sensor comprises a plurality of lenses to increase light incident on the plurality of pixels.

20. A machine-readable medium having stored thereon data representing sequences of instructions that, when executed by a processor, cause the processor to perform operations comprising:
    (a) capturing an image with an image sensor, the image sensor comprising a plurality of pixels;
    (b) obtaining an output relating to the image from a first pixel of the plurality of pixels, wherein the first pixel is included within a sector of the array, the sector containing a plurality of pixels; and
    (c) normalizing the output from the first pixel to correlate with photon flux striking the image sensor, herein normalizing the output from the first pixel comprises:
        (i) obtaining an output from each pixel in the sector;
        (ii) determining an average output value for each type of pixel in the sector;
        (iii) determining which of the average output values for the pixels in the sector is the highest; and
        (iv) assigning the highest average output value to each of the pixels in the sector.

21. The medium of claim 20, wherein normalizing the output from the first pixel comprises:
    determining a normalization factor for the first pixel; and
    converting the output of the first pixel to a photon flux value for the first pixel using the normalization factor.

22. The medium of claim 21, wherein the normalization factor for the first pixel is based at least in part on the wavelength of light striking the first pixel.

23. The medium of claim 22, wherein the image sensor includes a first filter, the first pixel being associated with the first filter, and wherein the normalization factor for the first pixel is based at least in part on a color of the first filter.

24. The medium of claim 23, further comprising instructions that, when executed by the processor, cause the processor to perform operations comprising calibrating the normalization factor prior to capturing the image.

25. The medium of claim 24, wherein calibration of the normalization factor for the first pixel includes:
    directing a light on the first pixel, a wavelength and an intensity of the light being known;
    capturing an image of the light using the image sensor;
    obtaining data from the first pixel relating to the image of the light;
    comparing the data from the image sensor to an expected value for the light; and
    calculating the normalization factors based at least in part on the comparison of the data from the first pixel with the expected value for the light.

26. The medium of claim 20, wherein the type of each pixel is based at least in part on a color of a filter for each pixel.

27. The medium of claim 20, wherein the image sensor is a complementary metal oxide semiconductor (CMOS) image sensor.

28. The medium of claim 27, wherein the image sensor is a color image sensor.

29. The medium of claim 28, further comprising instructions that, when executed by the processor, cause the processor to perform operations comprising producing an image based on a normalized output for each pixel in the plurality of pixels.

30. The medium of claim 29, wherein the image is a monochrome image.

31. The medium of claim 20, wherein the image sensor comprises a lens to increase light incident on the first pixel.

32. An imaging system comprising:
    (a) means for capturing an image with an image sensor, the image sensor comprising a plurality of pixels;
    (b) means for obtaining an output relating to the image from each of the plurality of pixels;
    (c) means for normalizing the output from each pixel in the plurality of pixels to correlate with photon flux incident on the image sensor, wherein the means for normalizing the output from each pixel in the plurality of pixels comprises:
        (i) means for determining an output for each pixel in a sector of the image sensor, the sector including two or more of the plurality of pixels;
        (ii) means for determining an average output for each type of pixel in the sector;
        (iii) means for comparing the average output for each type of pixel in the sector and for determining which of the average outputs is highest; and
        (iv) means for assigning the highest average output to each of the pixels in the sector.

33. The imaging system of claim 32, wherein the means for normalizing the output from each pixel in the plurality of pixels comprises:
    means for determining a normalization factor for each pixel in the plurality of pixels; and
    means for converting the output for each pixel using the normalization factor for the pixel.

34. The imaging system of claim 33, further comprising means for calibrating the normalization factors for the plurality of pixels.

* * * * *